United States Patent [19]

Young

[11] Patent Number: 5,758,014

[45] Date of Patent: May 26, 1998

[54] ELECTRIC VEHICLE TRACTION CONTROL SYSTEM AND METHOD

[75] Inventor: Ronald W. Young, Whittier, Calif.

[73] Assignee: Delco Electronics Corp., Kokomo, Ind.

[21] Appl. No.: 692,362

[22] Filed: Aug. 5, 1996

[51] Int. Cl.$^6$ ............................................. G05F 1/10
[52] U.S. Cl. ...................... 388/815; 318/52; 318/434; 318/798; 318/815
[58] Field of Search .............. 318/52, 434, 798–815; 388/815

[56] References Cited

U.S. PATENT DOCUMENTS

| | | | |
|---|---|---|---|
| 4,035,698 | 7/1977 | Soderberg | 318/52 |
| 4,136,303 | 1/1979 | Almquist et al. | 318/52 |
| 4,686,434 | 8/1987 | Kojima et al. | 318/52 |
| 4,995,862 | 2/1991 | Arocha | 318/52 X |
| 5,631,829 | 5/1997 | Takasaki et al. | 318/52 X |

*Primary Examiner*—Karen Masih
*Attorney, Agent, or Firm*—Mark A. Navarre

[57] ABSTRACT

A system and method that may be implemented in a power inverter or controller, for example, that uses the speed of a rotor to control the torque output of a motor of an electric vehicle. A rotor encoder coupled to the rotor of the motor provides encoder signals that indicate the speed of the rotor and thus the speed of the vehicle. Alternatively, wheel speed sensors may be employed in lieu of the encoder to provide sensed signals that are processed to produce traction control of the vehicle. By monitoring the rate of change of the signals from the encoder or sensor, the controller determines if the drive wheels are spinning due to loss of traction. If this condition is detected, the controller reduces torque until traction has been regained.

6 Claims, 1 Drawing Sheet

ELECTRIC VEHICLE TRACTION CONTROL SYSTEM AND METHOD

BACKGROUND

The present invention relates generally to electric vehicles, and more particularly, to a system and method that implements traction control in electric vehicles.

The assignee of the present invention designs and builds control systems for use in electric vehicles, such as for controlling the speed of a motor of an electric vehicle and braking the electric vehicle, for example. Prior efforts by the assignee of the present invention to add traction control systems to electric vehicles has been implemented in a controller developed for antilock braking system (ABS) control. An algorithm was developed for use in the ABS controller that processes speed inputs from wheel speed sensors located on all four wheels. Since traction control is limited to controlling torque to the drive wheels, the cost of wheel speed sensors to non-drive wheels increases the overall cost of the vehicle.

It would therefore be an improvement in the art to have control apparatus and a method that implements traction control without requiring an antilock braking system. Accordingly, it is an objective of the present invention to provide for a system and method that implements traction control in electric vehicles.

SUMMARY OF THE INVENTION

To meet the above and other objectives, the present invention provides for a system and method that may be implemented in a power inverter or controller, for example, that uses rotor speed to control the torque output of a motor of an electric vehicle. An encoder coupled to the rotor of the motor provides encoder signals that indicate the speed of the rotor and thus the speed of the vehicle. Alternatively, wheel speed sensors may be employed in lieu of the rotor encoder to provide sensed signals that are processed to produce traction control of the vehicle. By monitoring the rate of change of the signals derived from the encoder or sensor, the controller determines if the drive wheels are spinning due to loss of traction. If this condition is detected, the controller reduces torque until traction has been regained. The control of torque based upon the rate of change of the rotor is the heart of the approach of the present invention.

More particularly, the present system and method implements traction control in an electric vehicle employing an electric drive motor that is powered by electric batteries under control of a controller or processor, and wherein the motor is coupled to drive wheels whose traction is to be controlled. The system has an encoder for monitoring the rate of change of speed of the rotor of the electric drive motor and for producing encoder signals that indicate the speed of the rotor to determine if the drive wheels are spinning due to loss of traction. The controller (processor), processes the encoder signals to determine if the drive wheels are spinning due to loss of traction and produces torque control signals when the drive wheels are spinning that adjusts the output torque of the motor to control the traction of the wheels.

Processing is implemented in the controller by sampling current and previous rotor speed values derived from the encoder signals and determining the rate of change of the rotor by subtracting the current speed value from the prior rotor speed value. The rate of change of the rotor is then compared to a programmable threshold value to determine if the drive wheels slip. If the drive wheels slip, a torque command value applied to the motor is reduced until the condition no longer exists and if the drive wheels do not slip, the torque command is adjusted to be equal the commanded input value. Consequently, if loss of traction is experienced, lowering the torque value slows down the rotor thus enabling the drive wheels to regain traction. The present invention thus eliminates the use of an antilock braking system to perform traction control.

The present invention reduces the cost of the module and electric vehicle in which it is employed and increases the performance of an electric traction system without adding separate and/or additional controllers. By adding this algorithm to the propulsion controller, the electric vehicle has an improved ability to start moving on slick surfaces. Previous versions of traction control relied on wheel speed sensors and a separate controller to determine whether or not a loss of traction occurred. The inclusion of this algorithm allows the deletion of wheel speed sensors and a separate controller for the purposes of traction control. These functions may need to be retained for antilock brake system (ABS) use.

The present invention is useable with an electric motor and inverter that uses encoder feedback, for example, to indicate rotor speed. The ability to add traction control at no additional cost enhances the marketability and desirability of the vehicles.

The present invention thus provides for an algorithm that monitors the rate of change of the rotor of the electric drive motor of the electric vehicle which is an indication of the speed of the vehicle. The rate of change of the rotor is compared to a programmable threshold value to determine if the drive wheels are slipping. If the drive wheels slip, the rate of change of the encoder/rotor speed is greater than the programmed value. For this case, the torque command from the controller is reduced until the condition no longer exists. Once the condition no longer exists, the torque command follows the commanded input value. The torque command is used to control the amount of current applied to the motor. By controlling the current applied to the motor, the torque generated by the motor is readily controlled. In conditions where a loss of traction are experienced, lowering the torque value slows the rotor down, thus enabling the drive wheels to regain traction.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
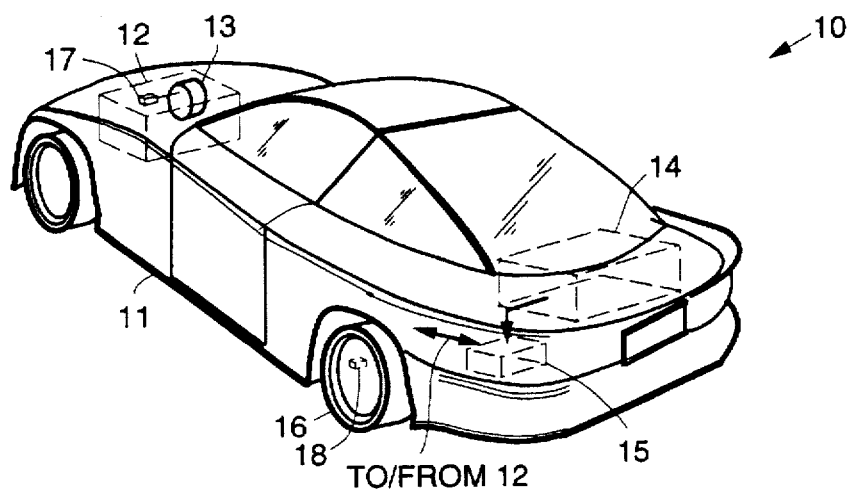
FIG. 1 shows a power inverter employing a method of providing traction control for an electric vehicle in accordance with the principles of the present invention.

Referring to the drawing figures, FIG. 1 shows a system 10 employing a method 20 (or algorithm 20) for implementing traction control in an electric vehicle 11 in accordance with the principles of the present invention. The electric vehicle 11 comprises an electric drive motor 12 having a rotor 13 that is powered by electric batteries 14 under control of a power inverter 15 or controller 15 which comprises processing means 15 employed by the present invention. The motor 12 is coupled to drive wheels 16 whose traction is indirectly monitored using a rotor encoder 17 coupled to the rotor 13 of the motor 12. Encoder signals produced by the rotor encoder 17 are processed to produce traction control of the vehicle 11. Alternatively, wheel speed sensors 18 may be employed in lieu of the rotor encoder 17 to provide sensed signals that are processed to produce traction control of the vehicle 11.

Figure 2:
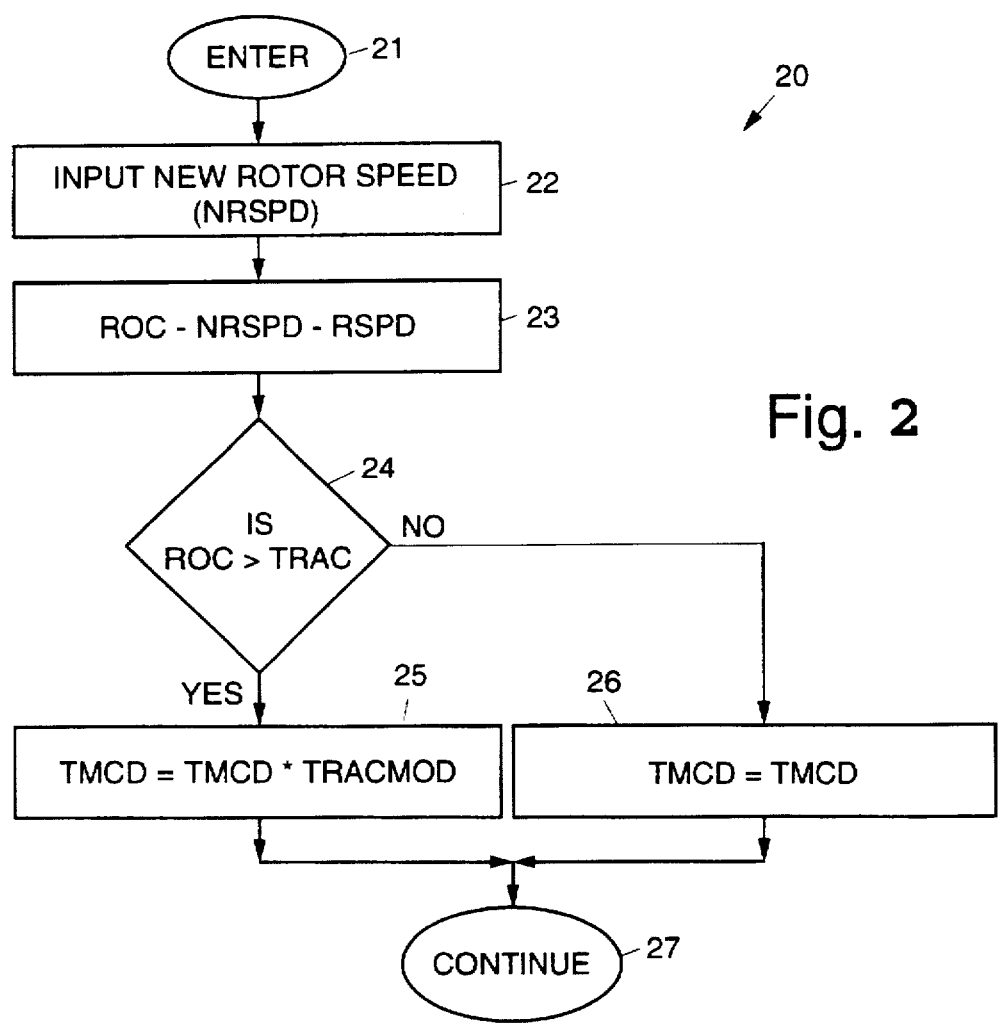
FIG. 2 shows a flow chart is detailing the method used in the present invention.

FIG. 2 shows a flow chart is detailing the method 20 (or algorithm 20) in accordance with the principles of the present invention of providing traction control for the electric vehicle 11. The present method 20 monitors the rate of change of the rotor 13 of the electric drive motor 12 which is an indication of the speed of an electric vehicle 11.

Current and previous rotor speed values are obtained or sampled from the encoder 17, or the wheel speed sensors 18 in the alternative embodiment (step 21). The rate of change (ROC) of the rotor 13 is determined by subtracting the current speed value (NRSPD) from the prior rotor speed value (RSPD) (step 22). The rate of change (ROC) of the rotor 13 is compared to a programmable threshold value (TRAC) to determine if the drive wheels 16 slip (step 23). If the drive wheels 16 slip, the rate of change of the speed determined by the encoder 17 and hence the rotor 13 is greater than the programmed threshold value. In this case, a torque command value (TCMD) produced by the controller 15 and applied to the motor 12 is reduced until the condition no longer exists (step 24). This is achieved by multiplying the torque command value times a programmable parameter (TRACMOD) that is used to lower the torque command value (step 25). Once the condition no longer exists, the torque command follows (is adjusted to be equal to) the commanded input value (step 26). The torque command is used to control the amount of current applied to the motor. By controlling the current applied to the motor, the torque generated by the motor is controlled. In conditions where a loss of traction is experienced, lowering the torque value (step 25) slows down the rotor 13 thus enabling the drive wheels 16 to regain traction.

With regard to FIG. 2, the value NRSPD is the newest or current rotor speed value derived from the encoder 17 or wheel sensor(s) 18, and corresponds to the current speed of the rotor 13. ROC is the rate of change that represents the acceleration rate of the rotor 13. RSPD is the rotor speed from the previous update. TRAC is a programmable threshold value that indicates that traction has been lost and that the drive wheel(s) 16 are slipping. TRACMOD is a programmable parameter that is used to lower the torque command value. TCMD is the commanded torque value, based on accelerator pedal position or outputs of a cruise control torque function, for example.

Thus, a system and method that implements traction control for use with electric vehicles have been disclosed. It is to be understood that the above-described embodiments are merely illustrative of some of the many specific embodiments which represent applications of the principles of the present invention. Clearly, numerous and varied other arrangements may be readily devised by those skilled in the art without departing from the scope of the invention.

I claim:

1. A system for implementing traction control in an electric vehicle including an electric drive motor having a rotor that is powered by electric batteries under control of a controller, and wherein the rotor is coupled to drive wheels whose traction is to be controlled, said system comprising:

encoder means for producing an encoder signal indicative of a speed of the rotor of the electric drive motor; and processing means coupled to the encoder signal for sampling current and previous rotor speed values derived from the encoder signal; determining the rate of change of the rotor by subtracting the current rotor speed value from the previous rotor speed value; comparing the determined rate of change of the rotor to a programmable threshold value to determine if the drive wheels are slipping; reducing a torque command value applied to the motor so long as the drive wheels are determined to be slipping; and adjusting the torque command to be equal to a commanded input torque value when the drive wheels are not determined to be slipping; wherein, if loss of traction is experienced, lowering the torque command value slows down the rotor thus enabling the drive wheels to regain traction.

2. The system of claim 1 wherein the processing means reduces the torque command value by multiplying the torque command value times a programmable parameter that is used to lower the torque command value.

3. The system of claim 1 wherein the torque command value is used to control motor current.

4. A method of traction control for an electric vehicle including an electric drive motor having a rotor that is powered by electric batteries under control of a controller, and wherein the rotor is coupled to drive wheels whose traction is to be controlled, said method comprising the steps of:

sampling current and previous rotor speed values;

determining a rate of change of speed of the rotor by subtracting the current rotor speed value from the previous rotor speed value;

comparing the determined rate of change to a programmable threshold value to determine if the drive wheels are slipping;

if the drive wheels are determined to be slipping, reducing a torque command value applied to the motor until the condition no longer exists; and if the drive wheels are determined to be not slipping, adjusting the torque command to be equal to a commanded input value;

wherein, if loss of traction is experienced, lowering the torque value slows down the rotor thus enabling the drive wheels to regain traction.

5. The method of claim 4 wherein the step of reducing the torque command value is achieved by multiplying the torque command value times a programmable parameter that is used to lower the torque command value.

6. The method of claim 4 wherein the torque command value is used to control motor current.

* * * * *